June 21, 1955  R. L. HALSTEAD ET AL  2,710,990
MOLDING DIE
Filed June 24, 1952  4 Sheets-Sheet 1
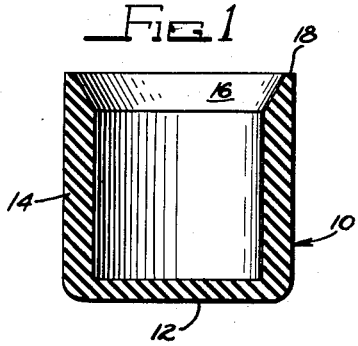
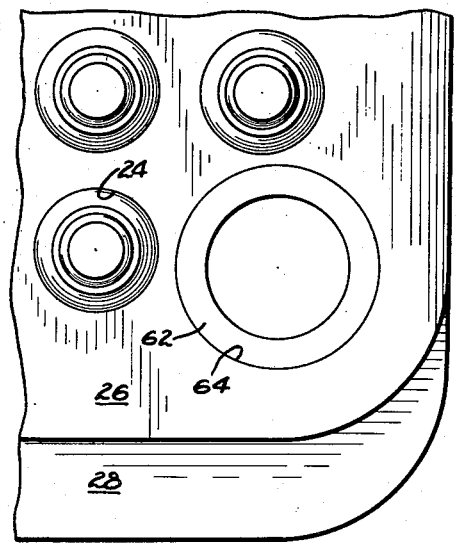
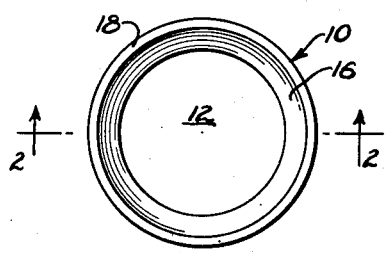
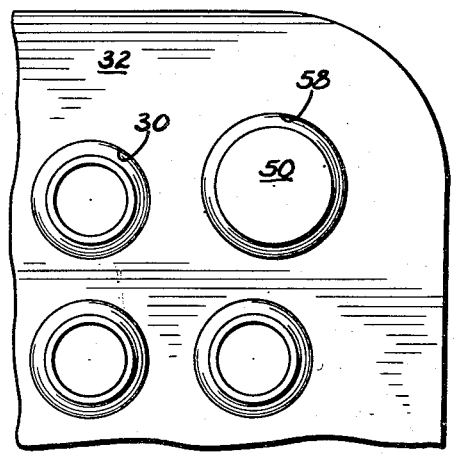
INVENTORS
Richard L. Halstead
Leon V. Whipple
BY
Bair, Freeman & Molinare
Attys.

June 21, 1955  R. L. HALSTEAD ET AL  2,710,990
MOLDING DIE
Filed June 24, 1952  4 Sheets-Sheet 2
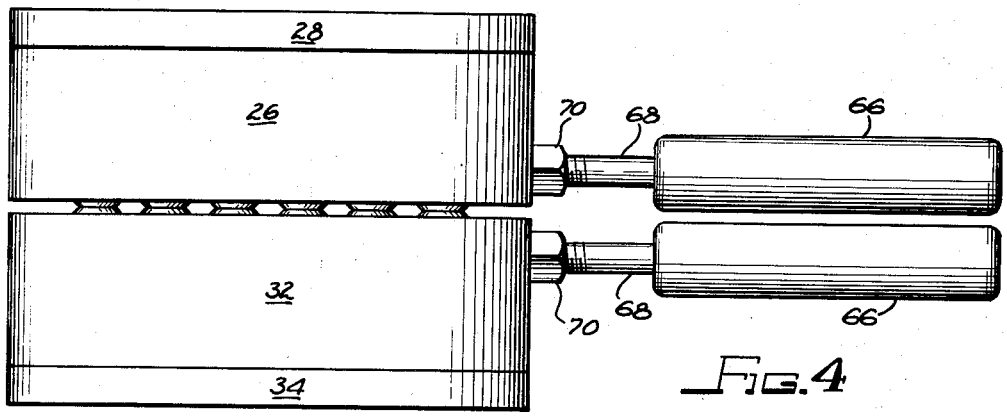
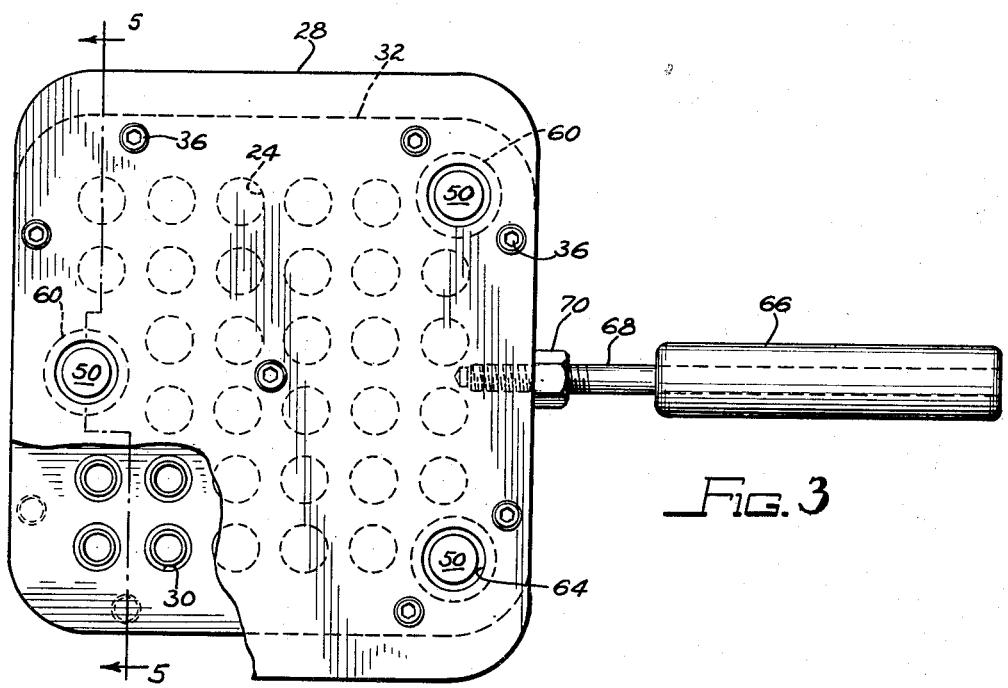
INVENTORS
Richard L. Halstead
Leon V. Whipple
BY
Bair, Freeman & Molinare
attys.

June 21, 1955  R. L. HALSTEAD ET AL  2,710,990
MOLDING DIE
Filed June 24, 1952  4 Sheets-Sheet 3
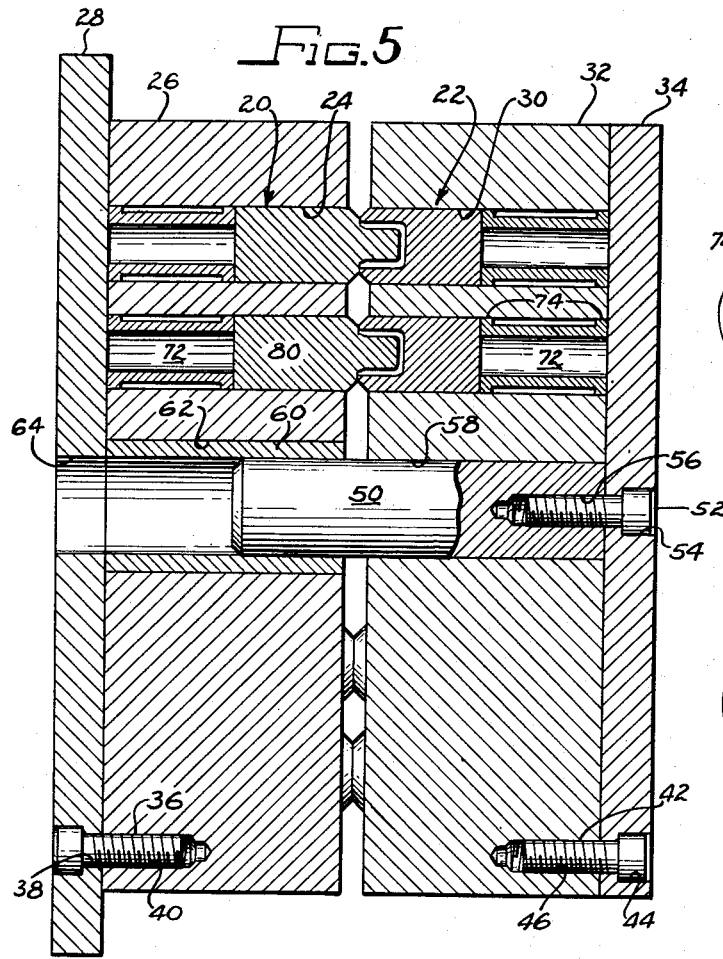
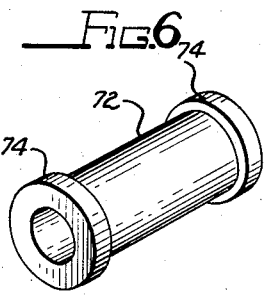
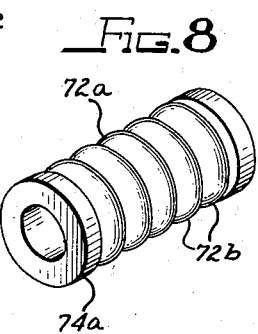
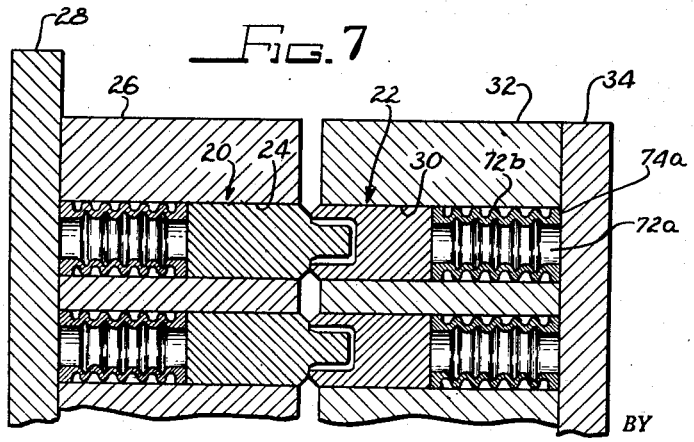
INVENTORS
Richard L. Halstead
Leon V. Whipple
BY
Bair, Freeman & Molinare
Attys.

June 21, 1955   R. L. HALSTEAD ET AL   2,710,990
MOLDING DIE
Filed June 24, 1952   4 Sheets-Sheet 4
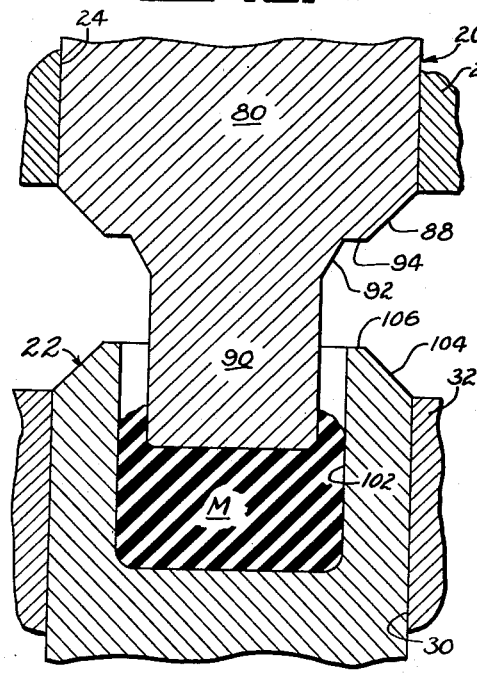
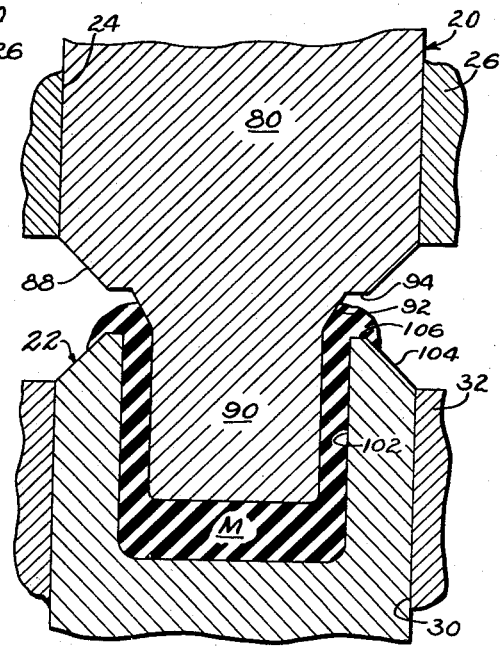
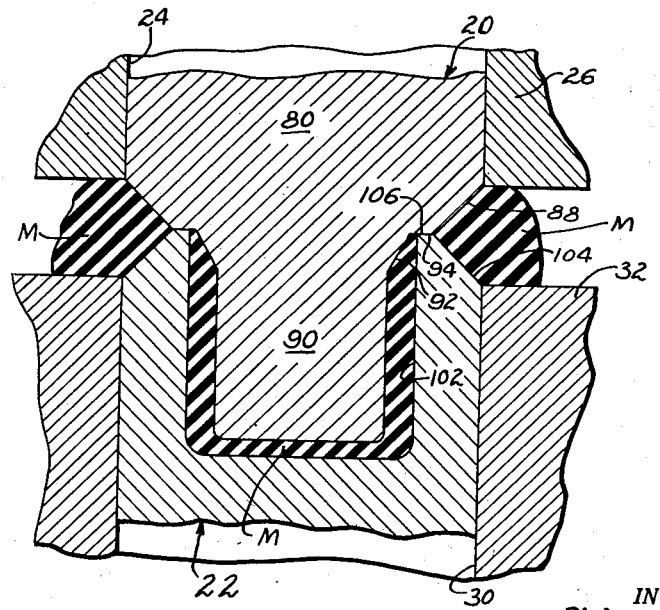
INVENTORS
Richard L. Halstead
Leon V. Whipple
BY
Bair, Freeman & Molinare
Attys.

United States Patent Office 2,710,990
Patented June 21, 1955

2,710,990

MOLDING DIE

Richard L. Halstead, Detroit, and Leon V. Whipple, Three Oaks, Mich., assignors to R. P. Scherer Corporation, Detroit, Mich., a corporation of Michigan Application June 24, 1952, Serial No. 295,226

9 Claims. (Cl. 18—42)

This invention relates to a mold or die for making a cup-shaped, tubular, or otherwise shaped article having a plane terminal lip surface by molding plastic material, such as rubber.

An important object of the present invention is to provide a mold or die of the type indicated capable of making a cup-shaped, tubular or otherwise shaped article having a plane terminal lip surface devoid of any appended fin or flash due to retention on said lip of an excess of plastic material from which the article is molded.

Another object of this invention is to provide a mold or die of the type indicated made up of complementary halves having narrow lands or mating surfaces in which at least one mold or die half is backed up by a generally columnar member capable of permanent deformation to make up for slight inaccuracies in machining or warpage, whereby expensive high precision machining is rendered unnecessary.

Other and further objects and features of the present invention will become apparent from the following description and appended claims as illustrated by the accompanying drawings showing, by way of examples, a cup-shaped article and a die for making the same. More particularly:

Figure 1 is a vertical cross sectional view taken along the line 1—1 of Figure 2 and showing a cup-shaped article to be made by the apparatus of the present invention;

Figure 2 is a plan view of the article of Figure 1;

Figure 3 is a plan view of apparatus according to the present invention for making the article of Figures 1 and 2;

Figure 4 is a side elevation of the apparatus of Figure 3;

Figure 5 is an enlarged cross sectional view taken along the line 5—5 of Figure 3;

Figure 6 is a perspective view on an enlarged scale of a columnar member forming part of the device of Figures 3 to 5 and serving to back up the individual dies of said articles;

Figure 7 is a fragmentary view similar to Figure 5 but showing a columnar back-up member of somewhat different structure;

Figure 8 is a perspective view on an enlarged scale of the columnar back-up member of Figure 7;

Figure 9 is a greatly enlarged fragmentary bottom plan view of one corner of the upper half of the apparatus of Figure 3;

Figure 10 is a greatly enlarged fragmentary plan view of that corner of the lower half of the apparatus of Figure 3 opposed to that portion of the upper half of the apparatus shown in Figure 9;

Figure 11 is a greatly enlarged fragmentary vertical cross sectional view of two die halves as opposed to each other in an initial stage of the molding process;

Figure 12 is a view similar to Figure 11 but illustrating an intermediate stage in the molding process; and Figure 13 is a view similar to Figure 11 but illustrating the final stage of the molding process.

Referring now to Figures 1 and 2, a cup-shaped article to be manufactured in the apparatus of the present invention is generally indicated by the reference numeral 10. As shown, the article includes a circular bottom 12 and a tubular side wall 14 having an upper lip of frusto-conical cross section limited inwardly by a flaring annular surface 16 and upwardly by a narrow plane annular surface 18. The article 10 of Figures 1 and 2 is devoid of any flash or fin appended to the lip thereof.

Apparatus for making the article of Figures 1 and 2 is shown in Figures 3 through 6, 9 and 10 as including a plurality of male mold halves indicated generally by the reference numeral 20 and an equal number of female mold halves indicated generally by the reference numeral 22. Each male mold half 20 is snugly but slidably seated in a recess 24 formed in a die plate 26 backed up by a cover plate 28. Each female mold half 22 is slidably seated in a recess 30 formed in a second die plate 32 backed up by a second cover plate 34. Suitable means (not shown) may be provided for preventing the mold halves 20 and 22 from falling out of the plates 26 and 32 when these plates are separated. The recesses 24 and 30 are aligned with each other so that the male mold halves 20 and the female mold halves 22 are thereby also aligned with each other. The first die plate 26 is attached to the first cover plate 28 by suitable means, for instance, bolts 36 extending through countersunk apertures 38 in the cover plate 28 into tapped apertures 40 in the die plate 26. Likewise, the second die plate 32 may be attached to the second cover plate 34 by bolts 42 extending through countersunk apertures 44 in the cover plate 34 into tapped apertures 46 in the die plate 32.

For accurately registering the male and female mold halves, dowel pins 50 may be attached to the second cover plate 34 by means of bolts 52 extending through countersunk apertures 54 in the cover plate 34 into tapped apertures 56 in the dowel pins. The latter project through apertures 58 formed in the second die plate 32 into tubular liners 60 seated in apertures 62 formed in the first die plate 26, the cover plate 28 being apertured, as at 64, in registration with the inner surface of the liners 60.

For handling the two parts of the mold, the latter may be provided with upper and lower handles 66. The handles 66 may be threaded over rods 68 inserted into tapped apertures formed in the die plates 26 and 32, being locked in position by nuts 70.

Each of the mold parts 20 and 22 are shorter than the recesses 24 and 30. A generally spool-shaped back-up member 72 disposed within each recess 24 and 30 spaces each mold part 20 and 22, respectively, from the cover plates 28 and 34. As shown, these back-up members 72 are generally tubular and have outer terminal flanges 74.

Each male mold half 20 includes (see Figures 11 to 13) a shank portion 80 slidably seated in an aperture 24 so as to rest on a back-up member 72. The shank portion 80 has a tapering end portion projecting from the first die plate 26 toward the second die plate 32 and limited outwardly by an annular surface 88. The male mold half 20 further comprises a die 90 projecting from the terminal tapering shank portion. The die 90 is constricted with respect to the tapering shank portion and has its proximal portion formed with a slight taper, as indicated at 92. The inner end of this tapering surface 92 falls short of the outer edge of the tapering shank portion, so that a shoulder 94 extending around the male mold half 20 is defined at the transition from the tapering terminal shank portion to the die 90.

The female mold halves 22 slidably seated within the apertures 30 rest upon the back-up members 72. Each female mold half 22 is formed with a recess 102 and with a terminal portion projecting outside the second die plate 32. Outwardly this terminal portion is limited by a tapering surface 104 and upwardly by an outer annular surface 106. The inside of the projecting portion is a straight continuation of the inner wall of the recess 102.

Particular attention is directed to the fact that the two surfaces 88 and 104 are aligned and that the outer edges of the surfaces 94 and 106 coincide when the two mold halves contact each other, while the inner edge of the surface 106 extends outside the inner edge of the surface 94. Thus, the surface 94, being of greater radial width than the surface 106, projects inwardly of the latter.

The surfaces 106 and the opposed portions of the surfaces 94 form the parting surface for the male mold halves 20 and the female mold halves 22.

Figures 7 and 8 illustrate a modification in which hollow columnar back-up members 72a having terminal outer flanges 74a are formed with intermediate walls fluted somewhat in the fashion of a bellows, as indicated at 72b.

The function of the molds is best illustrated in Figures 11 through 13. In Figure 11, plastic material M is shown as deposited within the recess 102 of the female mold half 22 in an amount in excess of that required to form the article of Figures 1 and 2. The die 90 is shown in an initial stage of the molding process where the die has penetrated only a short distance into the plastic material. Figure 12 shows the die 90 as having penetrated deeply into the plastic material M, displacing the latter upwardly so that the plastic material has entered the space between the annular parting surfaces of the two mold halves. Figure 13 shows the final stage of the molding process, with the die 90 at the end of its stroke and the parting surfaces of the two mold halves in engagement. As shown, the plastic material has been completely displaced from between the two parting surfaces. The plastic material is received in the space defined between the two die plates 26 and 32 outside the mold halves. It will be noted that the inner portion of the shoulder 94 of the male mold half serves to define the plane upper lip 18 of the finished article, while the flaring inner surface 16 of the lips is defined by the tapering die surface 92. The finished article is free from any appended fin or flash due to excess of plastic material, for the parting surfaces of the two mold halves (the surface 106 and the outer portion of the surface 94) are narrow enough to bring about complete outward displacement of plastic material present therebetween ahead of the final molding stage.

In order to avoid the formation of any flash or fin appended to the terminal lips of the molded article, two requirements must be met: First, the mating surfaces or lands of the two die or mold halves must be sufficiently narrow. Secondly, all the lands or mating surfaces within each mold half must be aligned accurately in one and the same half.

The above requirements can be met by extremely precise and expensive machining of the die or mold. But a mold or die so machined is very easily damaged, as by the accidental introduction of hard particles into the molding mixture, for the die or mold is quite rigid and unyielding and the force exerted on molding is considerable.

The back-up members of the present invention eliminate the need for accurate machining to align the lands or mating surfaces of the dies. The back-up members are originally fabricated to be slightly oversize, in particular, to be slightly longer than the length bringing about accurate alignment of the lands or mating surfaces of the dies. The initial molding operations permanently deform the back-up members by shortening the back-up members to exactly the length required for accurate aligning of the lands or mating surfaces of the dies.

Further, after the permanent initial deformation of the back-up members above referred to, the back-up members still retain sufficient resiliency to yield elastically a few thousandths of an inch when subjected to local forces in excess of the normal pressing force which would otherwise damage the lands or mating surfaces of the dies. Such excessive local stresses may be due, for instance, to accidental introduction of hard particles into the molding mixture.

Two characteristics of the back-up members make possible the above indicated function. First, the hollow columnar construction (with either straight or fluted cross sectional configuration of the walls, as illustrated, respectively, in Figures 6 and 8) permit permanent initial deformation and subsequent elastic deformation. In other words, the thickness and length of the walls are adjusted so as not to resist excessive stresses. For this purpose, the back-up members need not necesarily be hollow, but may have any suitable cross sectional configuration to permit permanent initial deformation and subsequent elastic deformation. Secondly, the material of construction of the back-up members is selected from metals and alloys having a low modulus of elasticity (less than $20 \times 10^6$ pounds per square inch), such as brass, bronze or aluminum.

By the use of the above described back-up members (in either or both of the die plates), we can construct our lands or mating surfaces so narrow that each surface unit thereof need only to be able to withstand without damage not more than from 150 to 200% of its pro rata share of the normal press force. At this narrow width, no appended fin or flash is formed. Yet this narrow margin of safety does not bring about damage to the dies on local overstressing, for the back-up members yield, by either permanent or elastic deformation, when the press force exceeds from 125 to 150% of the pro rata share of the normal press force.

If the back-up members are permanently deformed so as to render the back-up members too short or otherwise unfit for further use, they can easily be replaced.

The same type of back-up members can be used to support a single cavity die or mold having a rather long contour as measured around the periphery of the land.

While the present mold is particularly adaptable for handling rubber, other plastic materials can also be molded therein.

Many details of construction can be varied without departing from the principles of this invention and it is therefore not our purpose to limit the patent granted on this invention otherwise than necessitated by the scope of the appended claims.

What is claimed is:

1. A mold for forming a plurality of articles each having a plane terminal lip surface devoid of any appended fin or flash due to retention on said lip of an excess of material from which said articles are molded, said mold comprising a first and a second die plate, said die plates having their broad faces opposed and each formed with a plurality of recesses registering as between said two plates, a plurality of dowel pins on one of said plates, the other plate being apertured to receive said dowel pins, a plurality of male mold halves seated in the recesses in said first die plate, each of said male mold halves comprising a shank held within one of said plate recesses and a die projecting outside said recess, a plane shoulder being defined around said male mold half outside said recess at the transition from said shank to said die, the peripheral portion of said shoulder forming a parting surface for said male mold half and the inner portion of said shoulder serving to shape the plane terminal lip surface of one of said articles, and a plurality of female mold halves seated in the recesses of said second die plate and each formed with a terminal portion projecting outside said recess and defining a plane parting surface, all of said parting surfaces being so narrow that when the opposed parting surfaces are brought into engagement any excess of material being molded then present between said opposed parting surfaces will be squeezed out from between said surfaces, and permanently and elastically deformable generally columnar members seated in the recesses of at least one die plate for spacing the mold halves in said one die plate from the bottoms of the recesses of said one plate, said columnar members being more readily deformed both elastically and permanently than the die halves supported thereby.

2. A mold for forming an article having an upper plane terminal lip surface and a flaring inner lip surface, said lip being devoid of any appended fin or flash due to retention on said lip of an excess of material from which said article is molded, said mold comprising a male and a female mold half, said female mold half being formed with a plane parting surface, said male mold half comprising a shank and a die of smaller periphery than said shank projecting therefrom, a plane shoulder being defined around said male mold half at the transition from said shank to said die and the proximal portion of said die being tapered to form the flaring inner lip surface of said article, the peripheral portion of said shoulder forming a parting surface for said male mold half and the inner portion of said shoulder serving to shape the plane terminal lip surface of said article, and said two parting surfaces being so narrow that when said two parting surfaces are brought into engagement any excess of material being molded then present between said two parting surfaces will be squeezed out from between said surfaces, said mold further comprising means for holding and aligning said mold halves including members which are both permanently- and elastically-deformable backing up said die halves and characterized by a lower modulus of elasticity and a lower ultimate yield strength than said die halves but capable of retaining elasticity after permanent deformation.

3. A mold for forming a plurality of articles each having a plane upper terminal lip surface and a flaring inner lip surface, said lip being devoid of any appended fin or flash due to retention on said lip of an excess of material from which said articles are molded, said mold comprising a first and a second plate, said plates having their broad faces opposed and each formed with a plurality of recesses registering as between said two plates, a plurality of dowel pins on one of said plates, the other plate being apertured to receive said dowel pins, a plurality of male mold halves seated in the recesses in said first plate, each of said male mold halves comprising a shank held within one of said plate recesses and a die of smaller periphery than said shank projecting outside said recess, a plane shoulder being defined around said male mold half outside said recess at the transition from said shank to said die and the proximal portion of said die being tapered to form the inner flaring lip surface of said article, the peripheral portion of said shoulder forming a parting surface for said male mold half and the inner portion of said shoulder serving to shape the plane terminal lip surface of one of said articles, a plurality of female mold halves seated in the recesses of said second plate and each formed with a terminal portion projecting outside said recess and defining a plane parting surface, all of said parting surfaces being so narrow that when the opposed parting surfaces are brought into engagement any excess of material being molded then present between said opposed parting surfaces will be squeezed out from between said surfaces, and permanently and elastically-deformable generally columnar spacer members seated on the bottoms of said recesses for aligning the parting surfaces of said mold halves, said columnar members being subject to deformation more readily than said die halves on overstressing the latter.

4. A mold for forming an article having a plane terminal lip surface devoid of any appended fin or flash due to retention on said lip of an excess of material from which said article is molded, said mold comprising a male and a female mold half, said female mold half being formed with a plane parting surface, said male mold half comprising a shank and a die projecting therefrom but restricted with respect thereto, a plane shoulder being defined around said male mold half at the transition from said shank to said die, the peripheral portion of said shoulder forming a parting surface for said male mold half and the inner portion of said shoulder serving to shape the plane terminal lip surface of said article, and said two parting surfaces being so narrow that said parting surfaces will be damaged by exposure to twice the normal press force whereby when said two parting surfaces are brought into engagement any excess of material being molded then present between said two parting surfaces will be squeezed out from between said surfaces, said mold further comprising plates for holding and aligning said mold halves, each plate being formed with a recess slidably receiving one of said mold halves in alignment with the other mold half, and a permanently- and elastically-deformable generally columnar member spacing at least one of said mold halves from the bottom of the recess in which said one mold half is seated, the cross sectional area, length and material of construction of said columnar member being so adjusted as to render said columnar member deformable on exposure to one and one half the normal press force.

5. A mold for forming a plurality of articles each having a plane terminal lip surface devoid of any appended fin or flash due to retention on said lip of an excess of material from which said article is molded, said mold comprising upper and lower die plates each having a plurality of recesses aligned as between said plates, a plurality of male mold halves seated in the recesses in said upper die plate, a plurality of female mold halves seated in the recesses in said lower die plate in alignment with said male mold halves, each of said female mold halves being formed with a projecting terminal portion having a tapering outer surface and an inner plane parting surface merging with said outer surface, each of said male mold halves comprising a shank having a tapering end portion and a die of smaller periphery than said shank projecting therefrom, a plane shoulder being defined around said male mold half at the transition from said tapering shank end portion to said die, the peripheral portion of said shoulder forming a parting surface for said male mold half and the inner portion of said shoulder serving to shape the plane terminal lip surface of said article, said two parting surfaces being so narrow that when said two parting surfaces are brought into engagement any excess of material being molded then present between said two parting surfaces will be squeezed out from between said surfaces, the outward divergence of said tapering end portion and the outer surface of said projecting terminal female mold half portion serving to provide space between said die plates for receiving material squeezed out from between said parting surfaces, and a plurality of permanently- and elastically-deformable generally columnar members seated in said recesses to space said mold halves from the recess bottoms and constructed to be more readily deformed than said mold halves on overstressing of said mold halves.

6. A mold for forming a plurality of articles each having a plane terminal lip surface devoid of any appended fin or flash due to retention on said lip of an excess of material from which said articles are molded, said mold comprising a first and a second die plate, said die plates having their broad faces opposed and each formed with a plurality of recesses registering as between said two plates, a plurality of dowel pins on one of said plates, the other plate being apertured to receive said dowel pins, a plurality of male mold halves seated in the recesses in said first plate, said male mold halves each comprising a shank held within one of said plate recesses and a die projecting outside said recess, a plane shoulder being defined around said male mold half outside said recess at the transition from said shank to said die, the peripheral portion of said shoulder forming a parting surface for said male mold half and the inner portion of said shoulder serving to shape the plane terminal lip surface of one of said articles, a plurality of female mold halves seated in the recesses of said second plate and each formed with a terminal portion projecting outside said recess and defining a plane parting surface adapted to mate with the parting surface of one of said male mold halves, all of said parting surface being so narrow that when the opposed parting surfaces are brought into engagement any excess of material being molded then present between said opposed parting surfaces will be squeezed out from between said surfaces into the space between the broad faces of said die plates, and back-up members in said recesses resting on said die plates for supporting said die halves so that the parting surfaces for said male mold halves will all simultaneously meet the mating parting surfaces of said female mold halves, said back-up members being columnar and constructed of a permanently- and elastically-deformable metal having a modulus of elasticity lower than the metal of which the co-acting mold halves are constructed and being further characterized by cross-sectional area such that said back-up members will be yieldingly deformed at a pressure less than the pressure required to damage the individual mold halves.

7. A mold for forming an article having a plane terminal lip surface devoid of any appended fin or flash due to retention on said lip of an excess of material from which said article is molded, said mold comprising a male and a female mold half together with means for holding and aligning said mold halves, said male mold member being formed with a plane annular shoulder intermediate its ends, said female mold member being formed with a projecting lip having an outer edge aligned with the outer edge of said shoulder and an inner edge radially outside of the inner edge of said shoulder, said projecting lip forming a parting surface for said mold and being so narrow that when said lip is brought into engagement with said shoulder any excess of material being molded then present between said parting surface and said shoulder will be squeezed out from between said surface, the inner portion of said shoulder serving to form said upper plane lip surface of said article, said mold holding and aligning means including means defining a recess slidably receiving one of said mold halves together with a permanently- and elastically-deformable generally columnar member spacing said one mold half from the bottom of said recess and more readily deformable than said mold half on overstressing of said mold half.

8. A mold comprising two co-acting mold halves, plates having aligned recesses for slidably receiving said mold halves, and a generally columnar member which is both permanently-and elastically-deformable in one of said rescesses for spacing the mold half seated in said one recess from the bottom thereof, said columnar member being more readily deformed than the mold half supported thereby on overstressing of said mold half.

9. A mold comprising two co-acting mold halves having narrow lands or parting surfaces rendering said mold halves subject to damage on overstressing, plates having aligned recesses for slidably receiving said mold halves, and a generally columnar resilient member which is both permanently-and elastically-deformable in one of said recesses for spacing the mold half seated in said one recess from the bottom thereof at a distance adapting said mold half for cooperation with said other die half, said columnar member being more readily deformable than the die half supported by said columnar member on overstressing of the latter and retaining resiliency even after permanent deformation.

References Cited in the file of this patent

UNITED STATES PATENTS

| | | |
|---|---|---|
| 754,755 | Edison | Mar. 15, 1904 |
| 1,328,351 | Whiteley | Jan. 20, 1920 |
| 1,479,510 | Morgan et al. | Jan. 1, 1924 |
| 2,219,576 | Moreland | Oct. 29, 1940 |
| 2,298,057 | Kelm | Oct. 6, 1942 |
| 2,473,284 | Knaggs | June 14, 1949 |
| 2,479,350 | Haggart | Aug. 16, 1949 |
| 2,607,080 | Stewart | Aug. 19, 1952 |